United States Patent
Neve De Mevergnies et al.

(10) Patent No.: US 9,235,719 B2
(45) Date of Patent: Jan. 12, 2016

(54) APPARATUS, SYSTEM, AND METHOD FOR PROVIDING MEMORY ACCESS CONTROL

(75) Inventors: Michael Neve De Mevergnies, Beaverton, OR (US); Knut S. Grimsrud, Forest Grove, OR (US); Sergiu D. Ghetie, Hillsboro, OR (US); Prasun Ratn, Hillsboro, OR (US); Shahrokh Shahidzadeh, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/992,222

(22) PCT Filed: Sep. 29, 2011

(86) PCT No.: PCT/US2011/053961
§ 371 (c)(1),
(2), (4) Date: Jun. 6, 2013

(87) PCT Pub. No.: WO2013/048407
PCT Pub. Date: Apr. 4, 2013

(65) Prior Publication Data
US 2013/0262877 A1 Oct. 3, 2013

(51) Int. Cl.
*G06F 21/00* (2013.01)
*G06F 21/62* (2013.01)
(Continued)

(52) U.S. Cl.
CPC ............ *G06F 21/62* (2013.01); *G06F 11/1415* (2013.01); *G06F 17/30289* (2013.01); *G06F 21/445* (2013.01); *G06F 21/568* (2013.01); *G06F 21/572* (2013.01); *G06F 21/602* (2013.01); *G06F 21/6218* (2013.01); *G06F 21/79* (2013.01)

(58) Field of Classification Search
USPC .................................................. 713/189–194
See application file for complete search history.

(56) References Cited

U.S. PATENT DOCUMENTS 5,802,593 A 9/1998 Grimsrud
5,845,297 A 12/1998 Grimsrud et al.
(Continued)

FOREIGN PATENT DOCUMENTS

KR 1020050088172 9/2005
KR 10-0791293 1/2008
KR 10-1064164 9/2011

OTHER PUBLICATIONS

Notification Concerning Transmittal of International Preliminary Report on Patentability issued for PCT International Patent Application No. PCT/US2011/053961, mailed Apr. 10, 2014, 6 pages.
(Continued)

*Primary Examiner* — Ghazal Shehni
(74) *Attorney, Agent, or Firm* — Blakely, Sokoloff, Taylor & Zafman LLP

(57) ABSTRACT

Described herein are apparatus, system, and method for providing memory access control to protect software (e.g., firmware backup) and other data. The method comprises providing, by a processor, a protected storage area in a memory for storing backup image of software; detecting corruption in the software; accessing the backup image of the software from the protected storage area; and updating the corrupted software using the backup image, wherein the protected storage area is a reserved storage area of the memory.

27 Claims, 11 Drawing Sheets

(51) Int. Cl.
  *G06F 17/30* (2006.01)
  *G06F 21/60* (2013.01)
  *G06F 21/44* (2013.01)
  *G06F 21/56* (2013.01)
  *G06F 21/57* (2013.01)
  *G06F 21/79* (2013.01)
  *G06F 11/14* (2006.01)

(56) References Cited

U.S. PATENT DOCUMENTS

| | | |
|---|---|---|
| 5,920,896 A | 7/1999 | Grimsrud et al. |
| 6,023,713 A | 2/2000 | Grimsrud et al. |
| 6,253,296 B1 | 6/2001 | Grimsrud et al. |
| 6,434,663 B1 | 8/2002 | Grimsrud et al. |
| 6,711,675 B1 | 3/2004 | Spiegel |
| 6,742,080 B1 | 5/2004 | Grimsrud et al. |
| 6,917,992 B2 | 7/2005 | Grimsrud et al. |
| 6,986,008 B2 | 1/2006 | Colvig et al. |
| 7,000,077 B2 | 2/2006 | Grimsrud et al. |
| 7,103,724 B2 | 9/2006 | Royer, Jr. et al. |
| 7,107,369 B2 | 9/2006 | Bennett et al. |
| 7,113,003 B2 | 9/2006 | Grimsrud |
| 7,124,248 B2 | 10/2006 | Huffman et al. |
| 7,330,939 B2 | 2/2008 | Grimsrud et al. |
| 7,515,528 B2 | 4/2009 | Grimsrud et al. |
| 7,774,781 B2 | 8/2010 | Dees et al. |
| 8,365,983 B2 | 2/2013 | Shahidzadeh et al. |
| 8,522,322 B2 | 8/2013 | Wishman et al. |
| 2002/0083331 A1* | 6/2002 | Krumel ............ 713/200 |
| 2004/0193737 A1 | 9/2004 | Huffman et al. |
| 2005/0064859 A1* | 3/2005 | Kotzin et al. ............ 455/419 |
| 2005/0125681 A1* | 6/2005 | Bressy et al. ............ 713/189 |
| 2007/0079015 A1 | 4/2007 | Royer, Jr. et al. |
| 2007/0156955 A1 | 7/2007 | Royer, Jr. et al. |
| 2009/0144347 A1 | 6/2009 | Boyd et al. |
| 2009/0150598 A1 | 6/2009 | Jung et al. |
| 2014/0115315 A1 | 4/2014 | Ratn et al. |

OTHER PUBLICATIONS

International Search Report & Written Opinion mailed Mar. 19, 2012 for International Patent Application No. PCT/US2011/053961.

* cited by examiner

300

| | | Pairing with processor 301 | |
|---|---|---|---|
| | | Un-paired 305 | Paired 306 |
| Privileged Mode 302 | Unprivileged 303 | Legacy Behavior-no pairing happended | Memory and processor have common secret to authenticate each other |
| | Privileged 304 | Invalid | Memory and processor are mutually authenticated and special commands are unlocked |

FIG. 3

APPARATUS, SYSTEM, AND METHOD FOR PROVIDING MEMORY ACCESS CONTROL

CLAIM OF PRIORITY

This application claims the benefit of priority of International Patent Application No. PCT/US2011/053961 filed Sep. 29, 2011, titled "APPARATUS, SYSTEM, AND METHOD FOR PROVIDING MEMORY ACCESS CONTROL," which is incorporated by reference in its entirety.

FIELD OF THE INVENTION

Embodiments of the invention relate generally to the field of software security. More particularly, embodiments of the invention relate to an apparatus, system, and method for providing memory access control to protect software.

BACKGROUND

Computer platforms (or simply platforms) incorporate multiple components (e.g., CPU processor, chipset, video processor/card, etc.) that run dedicated software called firmware (also referred to as platform firmware). The portion of firmware that is hardcoded or stored in a Read Only Memory (ROM) is considered immutable and therefore is expected not to vary over time. Platform firmware includes the first set of instructions that are executed by a computer system. To protect this important set of instructions from attacks or unintentional corruption, current solutions guard an image of the firmware by making it part of the root of trust. The root of trust that originates from the platform hardware passes from the hardware to the software through the firmware of the platform, and thus the firmware becomes a critical part of the chain of trust.

In order to correct bugs and/or add features to the firmware, there is generally another portion of the platform firmware that is programmable and updatable. Methods of compromising platform firmware are continually being developed. Compromising platform firmware enables an arsenal of very useful tools to attack a computer system. Unlike software attacks, compromised firmware is both hard to detect and difficult for a computer system to recover from. Compromised firmware is mostly invisible to the software layer of a computer system, including most anti-virus and spyware tools. The invisible nature of firmware makes it ideal for rootkits. Rootkits are compact and dormant malicious hooks in the platform that attain highest possible privilege and lowest visibility to running software. Their primary function is to provide an application programming interface (API) to viruses and worms on an infected system.

Furthermore, the potential damage from a malicious firmware attack is far worse than a software attack due to the persistent nature of the firmware. For example, a denial of service Disk Operating System (DOS) attack on the system software stack may result in a corrupted Operating System (OS) stack that would need to be reinstalled. In contrast, a compromised firmware DOS attack may result in a completely unbootable and unusable platform. A recovery solution to such firmware corruption may require reinstalling a backup image of firmware.

Contents on a non-volatile memory (e.g., hard disk drive, solid state drive) can be protected at the host end by the operating system or ring-0 software. However, any ring-0 malware can get access to the non-volatile memory and therefore corrupt any data on the non-volatile memory, including backup images of the firmware or any software that needs protection. Enabling a non-volatile memory password to protect the data in the non-volatile memory is also prone to malicious attacks. For example, when a user is prompted to enter the password for the non-volatile memory at boot time, the contents of the password are no longer protected from external/internal software attacks. Additionally, partitioning of memory areas on a non-volatile memory does not provide meaningful security of data in the hard dive by itself.

Current technologies have very poor, if any, mechanisms for providing a protected storage for the backup image of platform firmware or for any other software that needs protection.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

FIG. 3 is a table showing modes of operation for the protected storage of the non-volatile memory, according to one embodiment of the invention.

SUMMARY

Figure 1:
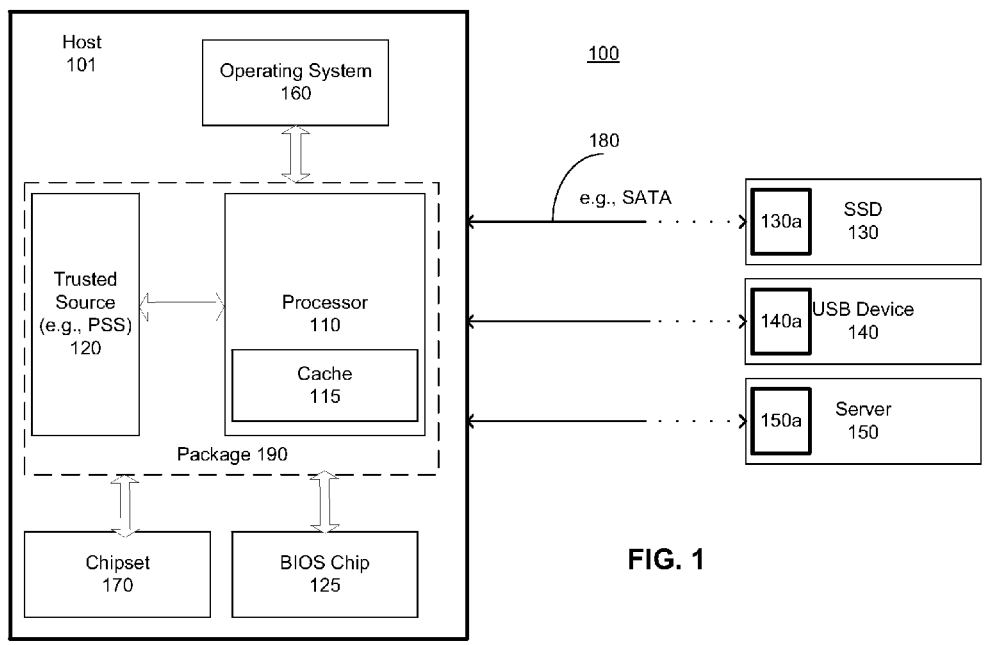
FIG. 1 is a high level system comprising a host coupled to a non-volatile memory which is operable to provide a protected storage and access for a backup image of platform firmware or for any other software that needs protection, according to one embodiment of the invention.

Embodiments of the invention relate to an apparatus, system, and method for providing a protected storage and access for a backup image of platform firmware or for any other software that needs protection.

In one embodiment, the method comprises providing, by a processor, a protected storage area in a memory for storing backup image of a software; detecting corruption in the software; accessing the backup image of the software from the protected storage area; and updating the corrupted software using the backup image, wherein the protected storage area is a reserved storage area of the memory.

In one embodiment, storing, by a memory controller, a backup image of a software in a reserved storage area of a non-volatile memory; pairing with a host, by provisioning secret and public keys from the host, to enter a paired and unprivileged state; authenticating the host, by a challenge-response protocol, to enter a paired and privileged state from the paired and unprivileged state; and allowing secure access, to the host, of the backup image of the software in response to entering the paired and privileged state.

In one embodiment, the system comprises a host comprising a processor; a display coupled to the host; and a solid state drive (SSD), coupled to the host, the SSD comprising: a memory controller, coupled to a non-volatile memory, operable to: store a backup image of a software in a reserved storage area of the non-volatile memory; pair with the host, by provisioning secret and public keys from the host, to enter a paired and unprivileged state; authenticate the host, by a challenge-response protocol, to enter a paired and privileged state from the paired and unprivileged state; and allow secure access, to the host, of the backup image of the software in response to entering the paired and privileged state.

In one embodiment, the method discusses above is executed by computer executable instructions. In one embodiment, the apparatus includes a machine readable storage medium including computer executable instructions that when executed cause a processor to perform the method discussed above.

While the summary of the invention has been described in conjunction with specific embodiments thereof, many alternatives, modifications and variations of such embodiments will be apparent to those of ordinary skill in the art in light of the foregoing description. The embodiments of the invention are intended to embrace all such alternatives, modifications, and variations as to fall within the broad scope of the appended claims.

Detailed Description

Embodiments of the invention relate to an apparatus, system, and method for providing a protected storage and access for a backup image of platform firmware or for any other software that needs protection. In one embodiment, existing commands for reading and writing to logs in memory and existing memory structures (also called logs, or memory space) are re-used for providing secure access to the non-volatile memory, for example, non-volatile memories in a solid state hard drive (SSD), hard disk drive (HDD), etc. In one embodiment, an additional security layer is placed above the regular operational layer of the SDD to provide exclusive modes of operation to protected logs/areas of the non-volatile memory. In one embodiment, the non-volatile memory for the HDD is the magnetic medium.

In one embodiment, the method comprises providing, by a processor in a host, a protected storage area in a memory for storing backup image of software; detecting corruption in a software; accessing the backup image of the software from the protected storage area; and updating the corrupted software with the backup image, wherein the storage area is a reserved storage area of the memory. In one embodiment, the reserved storage area of the memory is a vendor specific storage area of the memory.

In one embodiment, the method comprises storing, by a memory controller in an SSD, a backup image of software in the reserved vendor specific storage area of a non-volatile memory; pairing with the host, by provisioning secret and public keys from the host, to enter a paired and unprivileged state; authenticating the host, by a challenge-response protocol, to enter a paired and privileged state from the paired and unprivileged state; and allowing secure access, to the host, of the backup image of the software in response to entering the paired and privileged state.

The term "provisioning" herein refers to placing a keying material (e.g., public key, private key, secret key) to a component (e.g., HDD, SSD, or any other non-volatile memory, or component comprising a non-volatile memory) by another component (host processor) so that other component can access the component.

The technical effect of the embodiments discussed herein is to provide secure access to backup firmware or any type of data (e.g., operating system binaries, application, end-user data, etc) in a non-volatile memory and to protect access (Read-only, Read-Write or other privileges) to those data or backup firmware.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" herein refers to two or more elements which are in direct contact (physically, electrically, magnetically, optically, etc.). The term "coupled" herein may also refer to two or more elements that are not in direct contact with each other, but still cooperate or interact with each other.

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

The terms "public/private keys" herein describe a set of cryptographic keys used for public-key cryptography. The key pair consists of a "public key" and a "private key." The key pair may be used for encryption, in which case the public key is used for encrypting data, and the private key used for decrypting the data. The key pair may also be used for digital signatures, in which case the private key is used for signing a message and the public key is used for verifying the message.

As used herein, a "public key" is the public half of a key pair. Among other uses, a public key may be used to encrypt data to ensure that it may only be decrypted by an entity holding the corresponding private key, or may be used to verify a signature created by an entity holding the private key. As used herein, a "private key" is the private or secret half of a key pair. Among other uses, a private key may be used to decrypt data that has been encrypted with the corresponding public key, or may be used to digitally "sign" an item.

The term "secret key" herein refers to a set of bits used in symmetric cryptographic schemes (as opposed to asymmetric or public key cryptography), i.e. the same key is used for encrypting a plain text message to its corresponding cipher text, and for decrypting the cipher text to the original plain text message. The secret key is shared between the parties participating in the encrypted message exchanges.

FIG. 1 is a high level system 100 comprising a host 101 coupled to one or more non-volatile memories which are operable to provide a protected storage for a backup image of platform firmware or for any other software that needs protection, according to one embodiment of the invention. In one embodiment, the non-volatile memory is part of a SSD 130. In one embodiment, the non-volatile memory is part of a server 150. In one embodiment, the non-volatile memory is one of a phase change memory (PCM), stacked PCM (PCMS, also referred to as PCM and switch), read-only memory (ROM), electrically erasable programmable read-only memory (EEPROM), or any other type of non-volatile memory device. In one embodiment, the non-volatile memory is a removable drive, e.g., a Universal Serial Bus (USB) memory stick 140, flash card, etc. In one embodiment, the non-volatile memory is part of a HDD.

In the following embodiments, modes for secure access between the SSD 130 and the host 101 are described. While the embodiments are discussed herein with reference to an SSD, they apply to any component with a non-volatile storage medium, such as HDD. In one embodiment, the processes discussed herein are packaged as a firmware update for a HDD.

In one embodiment, the host 101 comprises a package 190 which is operatively coupled to a non-volatile memory (which is part of SSD 130) via a bus 180. In one embodiment, the bus 180 Serial Advance Technology Attachment (SATA) input-output (I/O) bus. In one embodiment, the bus 180 is a Serially Attached Small System Computer (SAS) input-output (I/O). In one embodiment, other types of buses (e.g., Universal Serial Bus (USB), Peripheral Component Interconnect Express (PCI Express)) can be used for bus 180 without changing the essence of the embodiments discussed herein.

In one embodiment, the package 190 comprises a processor (CPU) 110 coupled to a cache 115 and a trusted source 120. In one embodiment the trusted source 120 is a processor secured storage (PSS) which stores a public, private, or secret key accessible by the processor via a secure interface. In one embodiment, the trusted source 120 is a private memory of the processor 110, where the private memory is configured to store the root of trust of the processor 110 and/or of the system 100. In one embodiment, the trusted source 120 resides outside the package 190. In one embodiment, the trusted source 120 is a Radio Frequency Identification Tag (RFID) which comprises a non-volatile random-access memory (NVRAM). In one embodiment the NVRAM is a NAND flash memory. In one embodiment the NVRAM is a NOR flash memory. In other embodiments, other types of non-volatile memories may be used in the RFID tag 120. In one embodiment, a public and/or secret key is stored in the NVRAM. In one embodiment, the public and/or secret key is protected by cryptography. In one embodiment, the processor 110 retrieves a secret key from the trusted source 120 via an Inter-Integrated Circuit (I2C) interface or an RF interface.

In one embodiment, the host 101 further comprises a basic input/output system (BIOS) chip 125, which includes a BIOS image. The BIOS image is an example of platform firmware, an image of which is stored in a dedicated storage area 130a of a non-volatile memory which is part of 130. In one embodiment the host 101 further comprises a chipset processor 170 which communicates with many peripheral devices including the SSD 130, USB Device 140, Server 150, display (not shown), etc. In one embodiment, the host comprises an operating system 160.

In one embodiment, the non-volatile memories in 130, 140, and 150 include dedicated storage areas 130a, 140a, and 150a, respectively. In one embodiment, the dedicated/reserved storage area 130a in the SSD 130 is a vendor-specific area. The embodiments discussed herein describe a secure access control mechanism to this vendor-specific area via SATA commands (e.g., READ LOG EXT, READ LOG DMA EXT, WRITE LOG EXT, and WRITE LOG DMA EXT as described in T13/2015-D Working Draft Project by American National Standard of Accredited Standards Committee INCITS ATA/ATAPI Command Set-2, Revision 2, Published Aug. 3, 2009). In other embodiments, other commands may be used for secure access of the non-volatile memory 204 by the host 101. The embodiments discussed herein may be used to provide secure access to any reserved storage area in a non-volatile memory. As mentioned above, the SSD 130 is being used as an example embodiment, and the concepts described herein can be used for other types of mass storage devices (e.g., HDD, memory stick, CD, DVD, etc.) having non-volatile memories.

Figure 2:
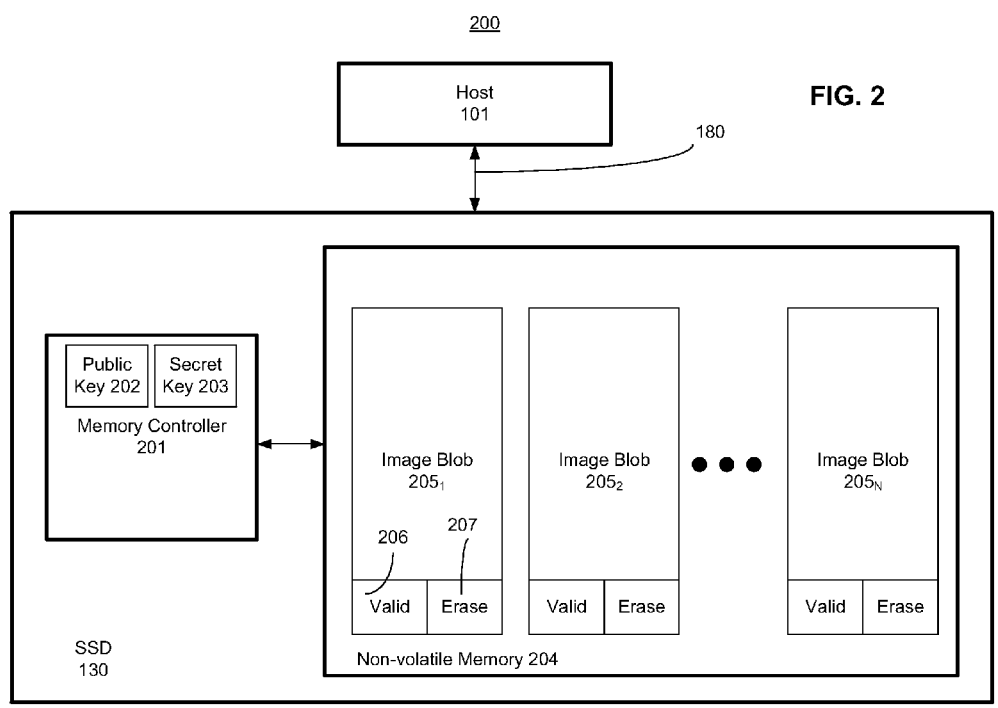
FIG. 2 is a high level system showing components of the protected storage in the non-volatile memory, according to one embodiment of the invention.

FIG. 2 is a high level system 200 showing components of the protected storage in the non-volatile memory 204, according to one embodiment of the invention. In one embodiment the SSD 130 comprises a memory controller 201. In one embodiment, the memory controller 201 is part of a system on chip (SOC) comprising a processor coupled to the memory controller 201. In one embodiment, the SOC includes other components e.g., wireless antenna, memory, etc. In one embodiment, the SSD 130 is positioned inside a personal computer, a tablet, a smart phone (also referred to as a smart device), etc.

In one embodiment, the memory controller 201 is coupled to the non-volatile memory 204 having reserved vendor specific storage areas $205_{1-N}$. Each reserved vendor specific area includes an area for storing the software/firmware image and associated valid 206 and erase 207 bits. In one embodiment, the SSD 130 includes the public 202 and secret 203 keys for mutual authentication with the host 101 to gain access to the protected areas $205_1$, 206, and 207. The protected areas $205_1$, 206, and 207 are included in the protected area 130a of the SSD 130. The valid 206 and erase 207 bits are discussed with reference to the modes of operation.

FIG. 3 is a table 300 showing modes of operation for the protected storage of the non-volatile memory, according to one embodiment of the invention. FIG. 3 is described with reference to FIGS. 1-2. In one embodiment, three modes are described to provide secure access to the reserved vendor specific storage area $205_1$. The three modes are grouped in two dimensions. The first dimension includes modes that depend on whether the SSD 130 is currently provisioned with specific keying material, i.e. the privileged modes 302. The second dimension includes modes that determine whether the SSD 130 is authenticated with a host 101, i.e. pairing modes 301. The term "pairing" herein refers to communicative connection between two devices for mutual authentication. Pairing is a way to link the host 101 with the SSD 130 by provisioning the same keying material, so that the host 101 and the SSD 130 may authenticate each other using the keying material.

In one embodiment, three modes are valid which are: un-paired 305 mode, paired 306 but unprivileged 303 mode, and paired 306 but privileged 304 mode. In other embodiments, more than the three modes can be added to further enhance the security layer added on top of the operation layer of the SSD. In one embodiment, only three modes are valid.

In the un-paired 305 mode, the SSD 130 is not paired with the host 101. The un-paired 305 mode is not a privileged mode. In one embodiment, when the SSD 130 and the host 101 are in un-paired 305 mode, they cannot communicate with one another to access the reserved vendor specific areas $205_{1-N}$. In one embodiment, the un-paired 305 mode is the legacy mode. In one embodiment, the READ LOG EXT and READ LOG DMA EXT commands to the images $205_{1-N}$ are allowed in the un-paired 305 mode. In one embodiment, the WRITE LOG EXT, and WRITE LOG DMA EXT commands to the images $205_{1-N}$ are allowed only if the valid bit 206 is clear.

The paired 306 and unprivileged 303 combination mode refers to the mode when the SSD 130 and the host 101 have a common secret to authenticate each other. The paired 306 and privileged 304 combination mode refers to the mode when the SSD 130 and the host 101 are mutually authenticated and special commands to communicate between the SSD 130 and the host 101 are unlocked, i.e. the special commands are operative in this mode. Examples of operations permitted in the paired 306 and privileged 304 mode include; creating, deleting, or modifying copies of the platform firmware images that the SSD 130 stores. In one embodiment, the exemplary operations can only be performed in the paired 306 and privileged 304 mode to prevent malware from performing these exemplary operations and compromising the copies of the firmware images. In one embodiment, the un-paired 305 but privileged 304 combination mode is an invalid mode of secure SSD 130 access.

Figure 4:
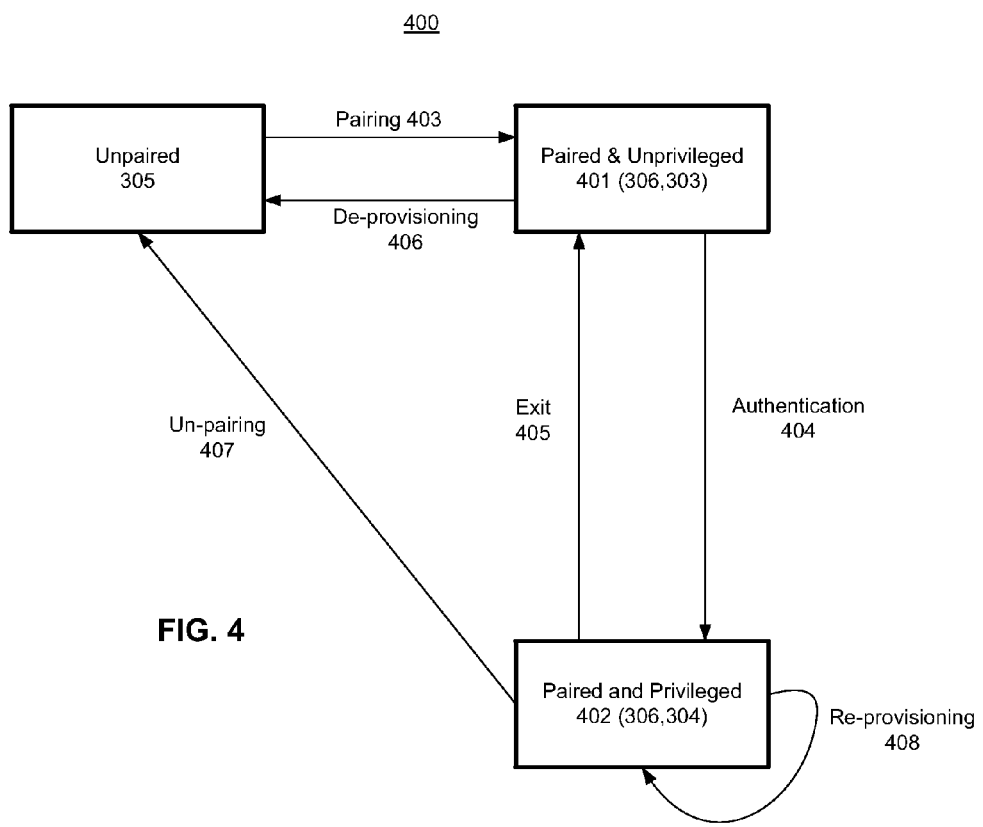
FIG. 4 is a high level flowchart showing transitions between the modes of operation for the protected storage of the non-volatile memory, according to one embodiment of the invention.

FIG. 4 is a high level flowchart 400 showing transitions between the modes of operation for the protected storage of the non-volatile memory, according to one embodiment of the invention.

Although the blocks in the flowchart 400 are shown in a particular order, the order of the actions can be modified. Thus, the illustrated embodiments can be performed in a different order, and some actions/blocks may be performed in parallel. Additionally, one or more actions/blocks can be omitted in various embodiments of providing a protected storage and access for a backup image of platform firmware or for any other software that needs protection. The flowcharts of FIG. 4 are illustrated with reference to the embodiments of FIG. 1-3.

In one embodiment, the secure access begins by initiating a pairing 403 process between the SSD 130 and the host 101 (interchangeably referred to as processor 110). In one embodiment, a successful pairing of the SSD 130 and the host 101 results in transitioning from the un-paired mode 305 to the paired and unprivileged mode 401. In one embodiment, the pairing process 403 is performed by the host 101 provisioning its keying material from the trusted source 120 to the SSD 130.

In one embodiment, the authentication process 404 is a mode transaction that allows the SSD 130 to enter the paired and privileged state 402 from the paired and un-privileged state 401. In one embodiment, the authentication is initiated upon a request from the host 101. In one embodiment, the SSD 130 authenticates the host 101 through a cryptographic protocol using its keying material (e.g., 202 and 203). In one embodiment, when the mutual authentication is successful, host 101 has complete access over the protected logs $205_{1-N}$, 206, and 207.

In one embodiment, the exit process 405 is a mode transaction that allows the SSD 130 to leave the paired and privileged state 402 for the paired and un-privileged state 401. In one embodiment, the host 101 can read the protected logs $205_{1-N}$ but cannot modify them in the paired and un-privileged state 401.

In one embodiment, the de-provisioning process 406 is a mode transaction that allows the SSD 130 to un-pair from the host 101 and return to its original state, i.e. the un-paired state 305, from the paired and unprivileged state 401. In one embodiment, de-provisioning process 406 is achieved by a challenge-response protocol. In one embodiment, the challenge-response protocol involves public key cryptography and using provisioned keying material from the trusted source 120 and/or the keying materials 202 and 203. In one embodiment, the public key 202 is used to verify de-provisioning licenses. For example, if a personal from the Information Technology (IT) department wants to install an SSD in another system without having the secret key with which the SSD was paired with, the personal would use the public key 202 to verify de-provisioning licenses.

In one embodiment, the un-pairing process 407 is a mode transaction that allows the SSD 130 to leave the paired and privileged state 402 directly to the un-paired state 305. In one embodiment, the host 101 deletes the keying material 202 and 203 without going through the de-provisioning process 406.

In one embodiment, the re-provisioning process 408 is a mode transaction that allows the SSD 130 to get updated keying materials 202 and 203 from the host 101. In such an embodiment, the SSD 130 remains in the paired and privileged state 402. In one embodiment, the host 101 re-provisions the keying material after a predetermined time lapse (e.g., 24 hrs).

Referring back to FIG. 2, in one embodiment each of the memory logs $201_{1-N}$ have corresponding valid 206 and erase 207 bits. In one embodiment, the memory logs $201_{1-N}$ are writeable in any mode (305, 401, 402) except when the valid bit 206 is enabled to 1 indicating that the memory logs $201_{1-N}$ are locked. In one embodiment, the valid bit 206 can only be modified in the paired and privileged mode 402.

In one embodiment, the host 101 manages the backup image $205_1$ on the SSD 130 by executing dedicated software with access to the keying materials 202 and 203 and/or the keying material in the trusted source 120. In one embodiment, the dedicated software is launched on an end-user interface (e.g., by pressing the power button of the host 101 for a predetermined time (e.g., 2 seconds)). In one embodiment, the dedicated software is authorized to be launched on an end-user interface in special processor mode. In one embodiment, the special processor mode includes Virtual Machine Monitor (VMM), Secure Enclave, System Management Mode (SMM). SSM is a special mode where the processor can perform platform specific tasks via the BIOS. In such an embodiment, the host 101 is able to enter the paired and privileged mode 402 of the SSD 130. In one embodiment, in the paired and privileged mode 402 the host 101 is operable to check the validity of the software image in one or more of the memory logs $205_{1-N}$ and then set the valid bit 206 to 1 for memory log it would like to lock from any writable access. In such an embodiment, the software image (one or more of the memory logs $205_{1-N}$) corresponding to the set valid bit 206 is protected from any possibility of corruption until the authenticated host 101 clears the valid bit 206 to 0.

In one embodiment, the erase bit 207 is writeable in any mode (305, 401, and 402). In one embodiment, the erase bit 207 is used to relinquish protected logs in one or more of the memory logs $205_{1-N}$ that are no longer needed for the computer platform. For example, the host 101 can program a new firmware image of a platform component to the SSD 130 in one or more of the memory logs $205_{1-N}$ for which the valid bit 206 is cleared, i.e. set to 0, and mark the previous version of firmware image in the one or more of the memory logs $205_{1-N}$ as erasable by setting the erase bit 207 to 1.

In one embodiment, once the host 101 is authenticated to the SSD 130, i.e. in paired in privileged mode 402, the host 101 can read the erase bit 207 of the corresponding one or more of the memory logs $205_{1-N}$ (for which the erase bit is set to 1) and decide whether to clear the valid bit 206 corresponding to that memory log to a 1.

Although the blocks in the flowcharts with reference to FIG. 5A-D and FIG. 6A-B are shown in a particular order, the order of the actions can be modified. Thus, the illustrated embodiments can be performed in a different order, and some actions/blocks may be performed in parallel. Additionally, one or more actions/blocks can be omitted in various embodiments of providing a protected storage and access for a backup image of platform firmware or for any other software that needs protection. The flow charts of FIG. 5A-D and FIG. 6A-B are illustrated with reference to the embodiments of FIG. 1-4.

Figure 5A:
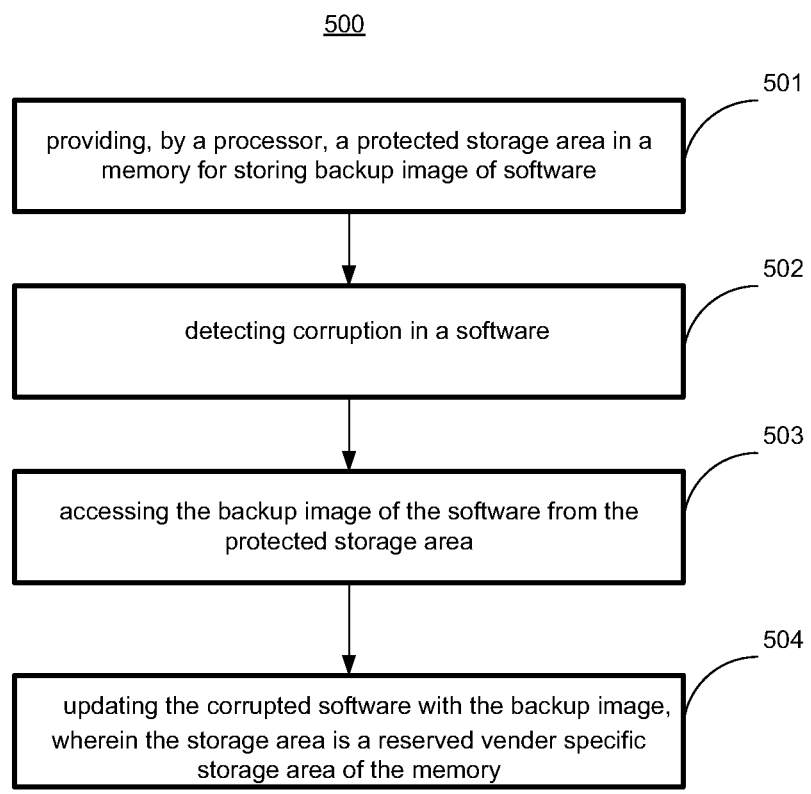
FIG. 5A is a method performed by a processor of the host to provide a protected storage for a backup image of platform firmware or for any other software that needs protection, according to one embodiment of the invention.

FIG. 5A is a method 500 performed by a processor 110 of the host 101 to provide a protected storage for a backup image of platform firmware or for any other software that needs protection, according to one embodiment of the invention.

At block 501, the processor 110 of the host 101 provides a protected storage area in the memory 204 for storing backup image $205_1$ of software. At block 502, the processor 110 detects corruption in software caused by any malware or virus. At block 503, the processor 110 begins the process of accessing the backup image $205_1$ of the software from the protected storage area 130a of the non-volatile memory 204. At block 504, the processor 110 updates the corrupted software with the backup image, wherein the storage area is a reserved vendor specific storage area 130a of the memory.

Figure 5B:
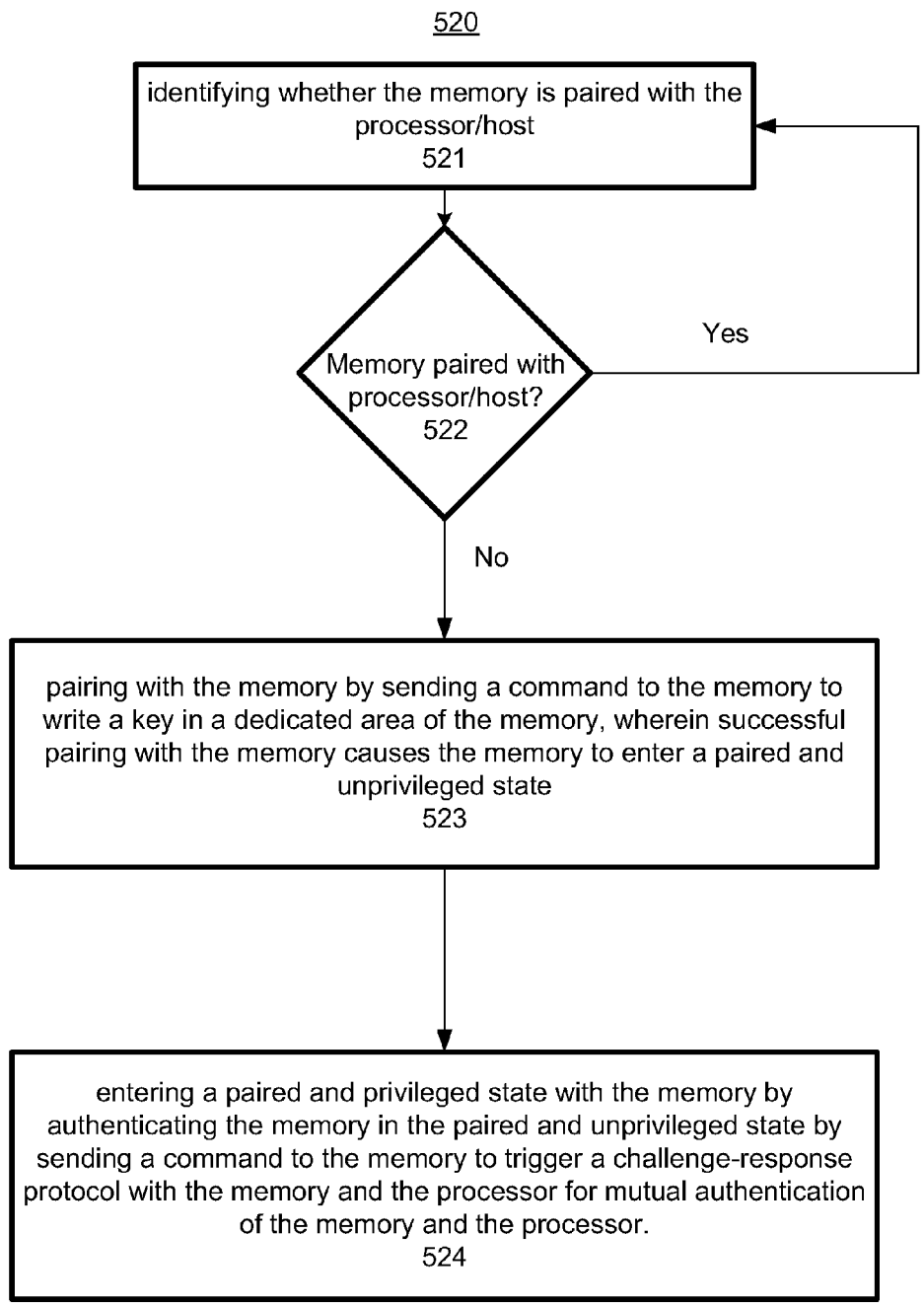
FIG. 5B is a method for accessing the backup image from the protected storage area, according to one embodiment of the invention.

FIG. 5B is a method 520 for accessing 503 the backup image $205_1$ from the protected storage area 130a, according to one embodiment of the invention. In the following flowcharts, the host 101 and the processor 110 are interchangeably.

At block 521, the processor identifies whether the SSD 130 is paired 306 with the processor 110 (or host 101). At block 522, a determination is made about the paired status. If the SSD 130 and the processor 110 are not paired, the method 520 proceeds to block 523, otherwise the method 520 continues to identify whether pairing occurred. At block 523, the processor 110 pairs with the SSD 130 by sending a command to the SSD 130 to write the keying material from the trusted source 120 to the SSD 130.

In one embodiment, the keying material is a secret key 203 which is stored in a dedicated location in the memory controller 201. In one embodiment the secret key 203 is stored in a dedicated location in the non-volatile memory 204. In one embodiment, the secret key is a 128 bit key. In one embodiment, the processor 110 receives an acknowledgement from the SSD 130 that it has received the secret key. The passing of the secret key from the trusted source 120 to the SSD 130 is also referred to the secret key provisioning.

In one embodiment, the processor 110 sends a public key from the trusted source 120 to the SSD 130. In one embodiment, the public key is stored in a dedicated area of the memory controller 201. In one embodiment, the public key is used in the de-provisioning transition which can be performed remotely, e.g., by a service provider (ISP). In one embodiment, the processor 110 receives an acknowledgement from the SSD 130 that it received the pubic key. The passing of the public key from the trusted source 120 to the SSD 130 is also referred to the public key provisioning. The SSD 130 enters a paired and unprivileged state in response to successful pairing 403.

At block 524, the processor 110 enters a paired and privileged state/mode 402 with the SSD 130 by authenticating 404 the memory which is initially in the paired and unprivileged state/mode 401. In one embodiment, the processor 110 sends a command to the SSD 130 that triggers a challenge-response protocol for mutual authentication. In one embodiment, the SSD 130 authenticates the processor 110 in response to the SSD 130 receiving a command from the processor 110 to initiate a challenge-response protocol for mutual authentication—first authentication. In one embodiment, the SSD 130 is authenticated by the processor 110 in response to the SSD 130 receiving a command from the processor 110 to initiate a challenge-response protocol for mutual authentication—second authentication. In one embodiment, both first and second authentications are performed serially/sequentially. In one embodiment, the first authentication is performed before the second authentication. In another embodiment, the second authentication is performed before the first authentication. In one embodiment, both first and second authentications are performed in parallel, i.e. concurrently.

Figure 5C:
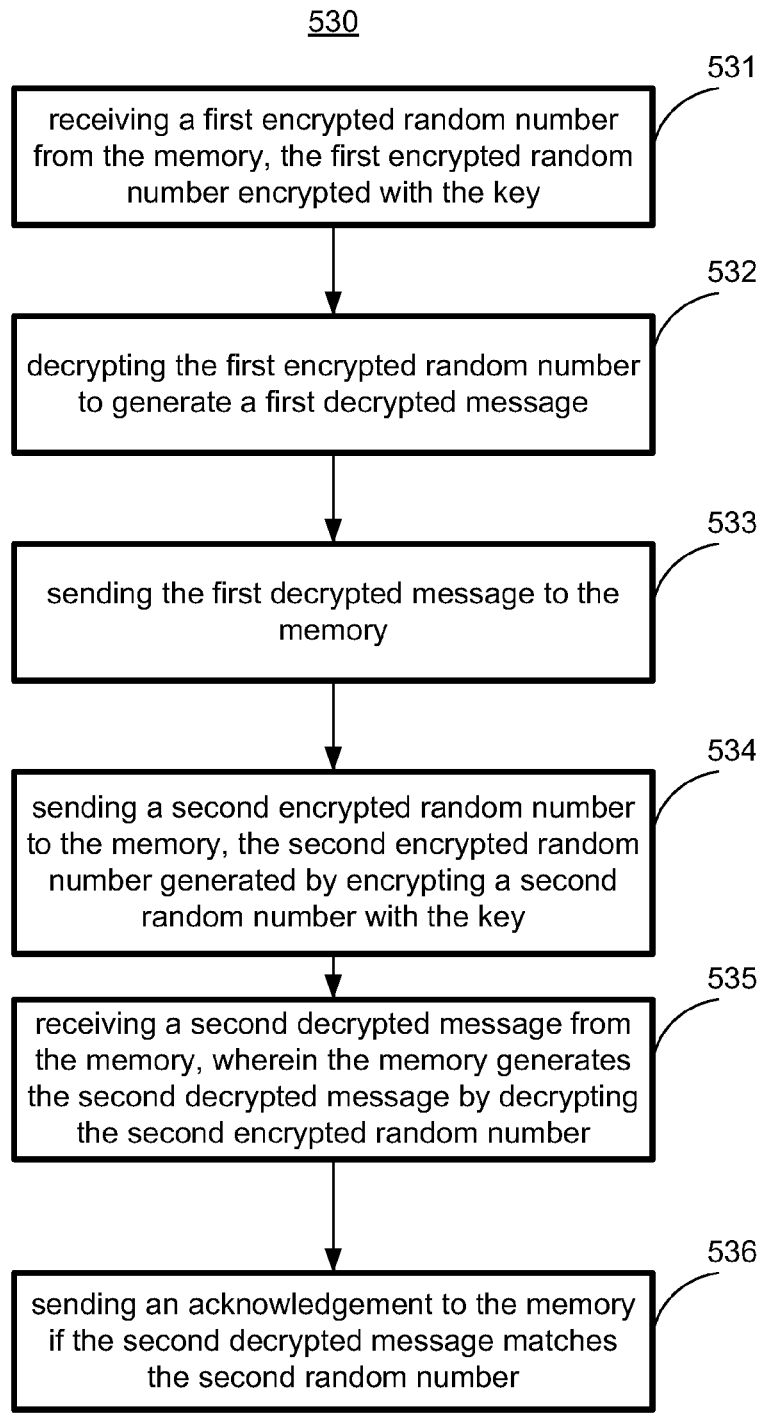
FIG. 5C is a method for mutual authentication of the host and the non-volatile memory having the protected storage, according to one embodiment of the invention.

FIG. 5C is a method flowchart 530 for mutual authentication of the host and the non-volatile memory having the protected storage, according to one embodiment of the invention.

At block 531, the processor 110 receives a first encrypted random number from the memory, the first encrypted random number encrypted with the key. In one embodiment, the first encrypted random number is the challenge generated by the SSD 130 for the processor 110. The processor 110 will then generate a response to the challenge. In one embodiment, the encryption of the first random number is performed by using cryptography. In one embodiment, the cryptography is performed with the Advanced Encryption Standard (AES) and the secret key 203 used in the pairing 403 with the processor. In other embodiments, other forms of cryptography may be used e.g., public key encryption. In one embodiment, the first random number is a 128 bit random number and the SSD 130 performs encryption based on AES to generate a 128 bit encrypted result from the AES encryption. In other embodiments, other sizes for the random number may be used.

At block 532, the processor 110 decrypts the first encrypted random number (the challenge) to generate a first decrypted message (response). In one embodiment, the processor 110 decrypts the first encrypted random number with its secret key from the trusted source 120 to generate the first decrypted message (response).

At block 533, the processor 110 sends the first decrypted message to the SSD 130, wherein the SSD 130 verifies the first decrypted message from the processor 110 for authenticating the processor 110. In one embodiment, if the SSD 130 verifies the first decrypted message to be the same as first random number, then the SSD 130 declares that its has authenticated the processor 110. In one embodiment, the SSD 130 sends an acknowledgement message to the processor 110 that it has successfully verified the first decrypted message and so the challenge-response protocol is successful. In such an embodiment, the SSD 130 enters the paired and privileged state 402. Blocks 531-533 correspond to the first authentication discussed with reference to FIG. 5B.

Referring back to FIG. 5C, at block 534 the processor 110 sends a second encrypted random number to the SSD 130, the second encrypted random number (challenge 2) generated by encrypting a second random number with a key. In one embodiment, the key is the secret key from the trusted source 120. In one embodiment, the encryption is performed by cryptography. In one embodiment, the cryptography is performed with the an encryption based on AES and the secret key from the trusted source 120 used in the pairing 403 with the SSD 130. In other embodiments, other forms of cryptography may be used e.g., public key encryption.

In one embodiment, the second random number is a 128 bit random number and the processor 110 performs AES to generate a 128 bit encrypted result from the AES encryption. In other embodiments, other sizes for the random number may be used.

At block 535, the processor 110 receives a second decrypted message from the SSD 130, wherein the SSD 130 generates the second decrypted message (response 2) by decrypting the second encrypted random number (challenge 2). In one embodiment, the SSD 130 decrypts the second encrypted random number with its secret key 203.

At block 536, the processor 110 sends an acknowledgement to the SSD 130 if the second decrypted message (response 2) matches the second random number. In such an embodiment, the SSD 130 enters the paired and privileged state 402. Blocks 534-536 correspond to the second authentication discussed with reference to FIG. 5B. As mentioned above, in one embodiment the second authentication is performed after the first authentication. In one embodiment, the first authentication alone is enough for entering the paired and privileged state 402.

Figure 5D:
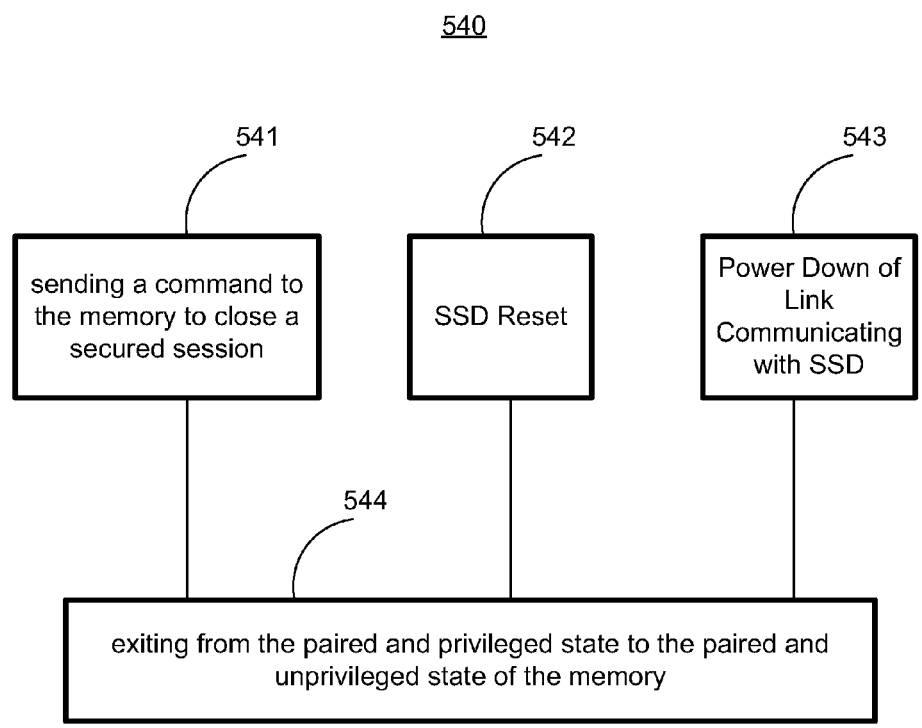
FIG. 5D is a method for exiting from a paired and privileged state to a paired and unprivileged state of the non-volatile memory, according to one embodiment of the invention.

FIG. 5D is a method flowchart 540 for exiting 405 from the paired and privileged state 402 to a paired and unprivileged state 401 of the non-volatile memory 204, according to one embodiment of the invention. In one embodiment, at block 541 the process of exiting 405 is initiated when the processor 110 sends a command to the SSD 130 to close the secure session. At block 544, the SSD 130 and the processor 110 exit from the paired and privileged state 402 and enter the paired and unprivileged state 401 in response to the command sent to the SSD 130 to close the secure session.

In one embodiment, at block 542 the process of exiting 405 is initiated when the SSD 130 is reset. In one embodiment, at block 543 the process of exiting 405 is initiated when the links (input-output communication with the processor 110) is reset or goes into training mode. In other embodiments, other events may trigger the exit process 405 when the processor no longer needs the secure access to memory logs $205_{1-N}$, e.g., when the processor 110 or any component of the computer platform realizes that a security breach has occurred in the computer platform.

In one embodiment, the processor 110 initiates the de-provisioning process 406 by sending a command to the SSD 130 that the processor 110 and the SSD 130 should be un-paired. In one embodiment, a challenge-response protocol is initiated with another machine (e.g., server) and the SSD 130 so that the processor 110 and the SSD 130 can be remotely un-paired securely. In such an embodiment, the SSD 130 returns to the un-paired mode 305 from the paired and un-privileged mode 401. In one embodiment, public key cryptography may be used with the provisioned keying material (e.g., 202 and/or 203) in the challenge-response protocol.

In one embodiment, the processor 110 or the host 101 sends a command to the SSD 130 that it no longer wishes to keep the two devices paired. This process corresponds to the un-pairing process 407. In such an embodiment, the SSD 130 deletes the keying material (e.g., 202 and/or 203) and returns to the un-paired mode 305 from the paired and privileged state 402.

In one embodiment, the processor 110 may want to re-provision 408 its keying material with the SSD 130. In one embodiment, the processor 110 sends a command to the SSD 130 with a new keying material from its trusted source 120 which will override the existing keying material (e.g., 202 and/or 203) on the SSD 130. In such an embodiment, the SSD 130 is in the paired and privileged mode 402. In one embodiment, the SSD 130 overrides the keying material (e.g., 202 and/or 203) with the new keying material from the processor 110 and then sends an acknowledgement message to the processor 110 that it has successfully re-provisioned the key. In another embodiment, the SSD 130 challenges the processor 110 so that the processor 110 proves to the SSD by a challenge-response protocol that the processor 110 knows the keying material (e.g., the secret key) even though the SSD 130 is in the paired and privileged state 402.

Figure 6A:
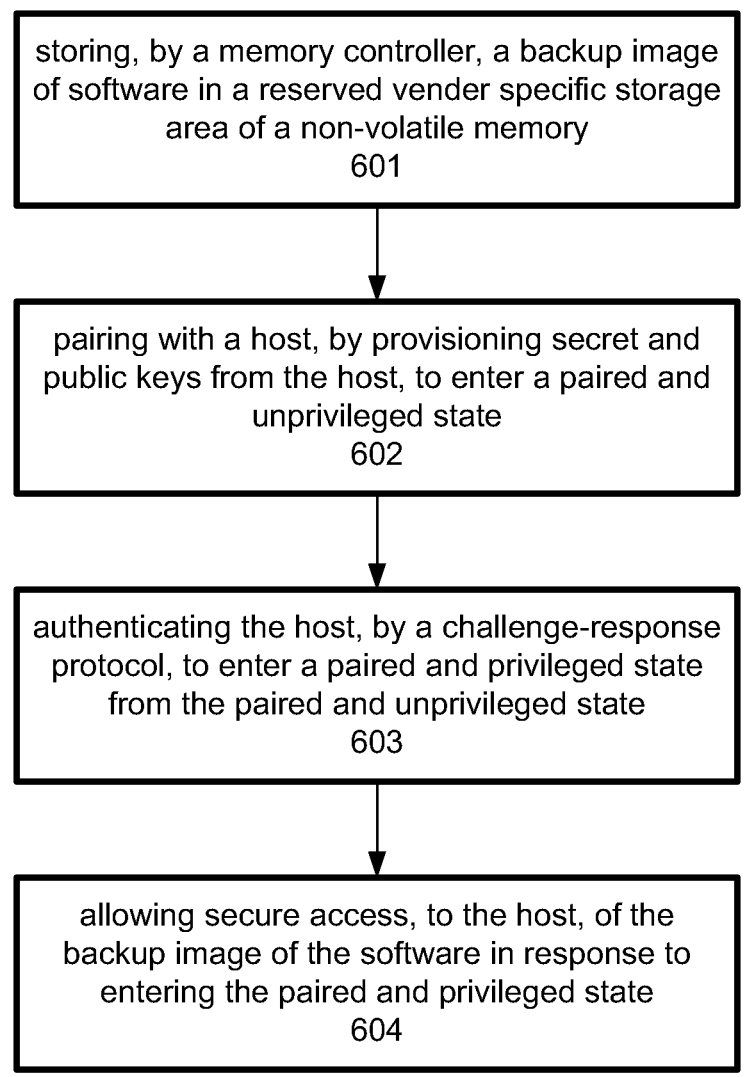
FIG. 6A is a method performed by a processor/controller of the non-volatile memory to provide a protected storage and access for a backup image of platform firmware or for any other software that needs protection, according to one embodiment of the invention.
Figure 6B:
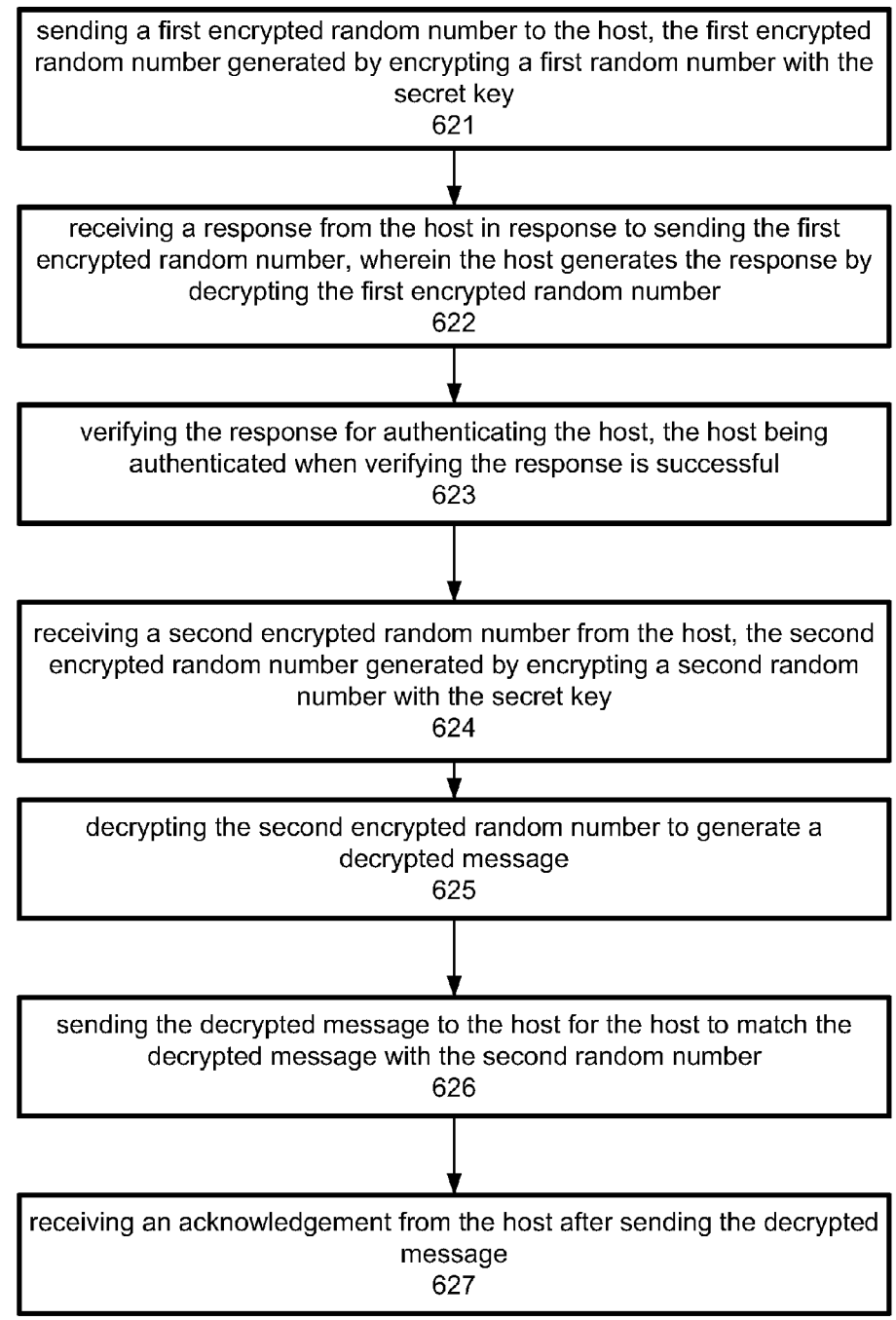
FIG. 6B is a method performed by a processor/controller of the non-volatile memory for mutual authentication of the host and the non-volatile memory having the protected storage, according to one embodiment of the invention.

FIG. 6A is a method 600 performed by the memory controller 201 of the non-volatile memory 204 to provide a protected storage and access for a backup image of platform firmware or for any other software that needs protection, according to one embodiment of the invention. The methods of FIGS. 6A-B are the methods performed by the SSD 130 and cover processes similar to the ones discussed with reference to FIGS. 5A-D, but performed by the SSD 130 instead of the processor 110 or host 101. So as not to be repetitive, all details are not described again.

At block 601, the memory controller 201 of the SSD 130 stores a backup image of software in a reserved vendor specific storage area $205_{1-N}$ of a non-volatile memory 204. At block 602, the memory controller 201 of the SSD 130 pairs 403 with the host 101 (interchangeably used for processor 110), by provisioning secret and public keys from the host 101, to enter a paired and unprivileged state 401. At block 603, the memory controller 201 of the SSD 130 authenticates 404 the host 101, by a challenge-response protocol, to enter a paired and privileged state 402 from the paired and unprivileged state 401. At block 604, the memory controller 201 of the SSD 130 sends an acknowledgement message to the host 101 about the successful authentication of the SSD 130 with the host 101 and allows secure access, to the host, of the backup image of the software in response to entering the paired and privileged state 402.

FIG. 6B is a method 620 performed by a processor/controller 201 of the non-volatile memory 204 for mutual authentication of the host and the non-volatile memory 204 (or SSD 130) having the protected storage, according to one embodiment of the invention. Blocks 621-623 correspond to the first authentication discussed with reference to FIGS. 5A-D. Blocks 624-627 correspond to the second authentication discussed with reference to FIGS. 5A-D.

At block 621, the memory controller 201 of the SSD 130 sends a first encrypted random number (challenge) to the host 101. In one embodiment, the first encrypted random number is generated by encrypting a first random number with the secret key 203. At block 622, the memory controller 201 of the SSD 130 receives a response from the host 101 in response to sending the first encrypted random number, wherein the host 101 generates the response by decrypting the first encrypted random number. At block 623, the memory controller 201 of the SSD 130 verifies the response for authenticating the host 101, the host 101 being authenticated when verifying the response is successful. The SSD 130 then sends an acknowledgement message to the host 101.

At block 624, the memory controller 201 of the SSD 130 receives a second encrypted random number (challenge 2) from the host 101. In one embodiment, the second encrypted random number is generated by encrypting a second random number with the secret key from the trusted source 120. At block 625, the memory controller 201 of the SSD 130 decrypts the second encrypted random number to generate a decrypted message (response 2). At block 626, the memory controller 201 of the SSD 130 sends the decrypted message to the host 101 for the host 101 to match the decrypted message with the second random number. At block 627, the memory controller 201 of the SSD 130 receives an acknowledgement from the host 101 after sending the decrypted message.

Figure 7:
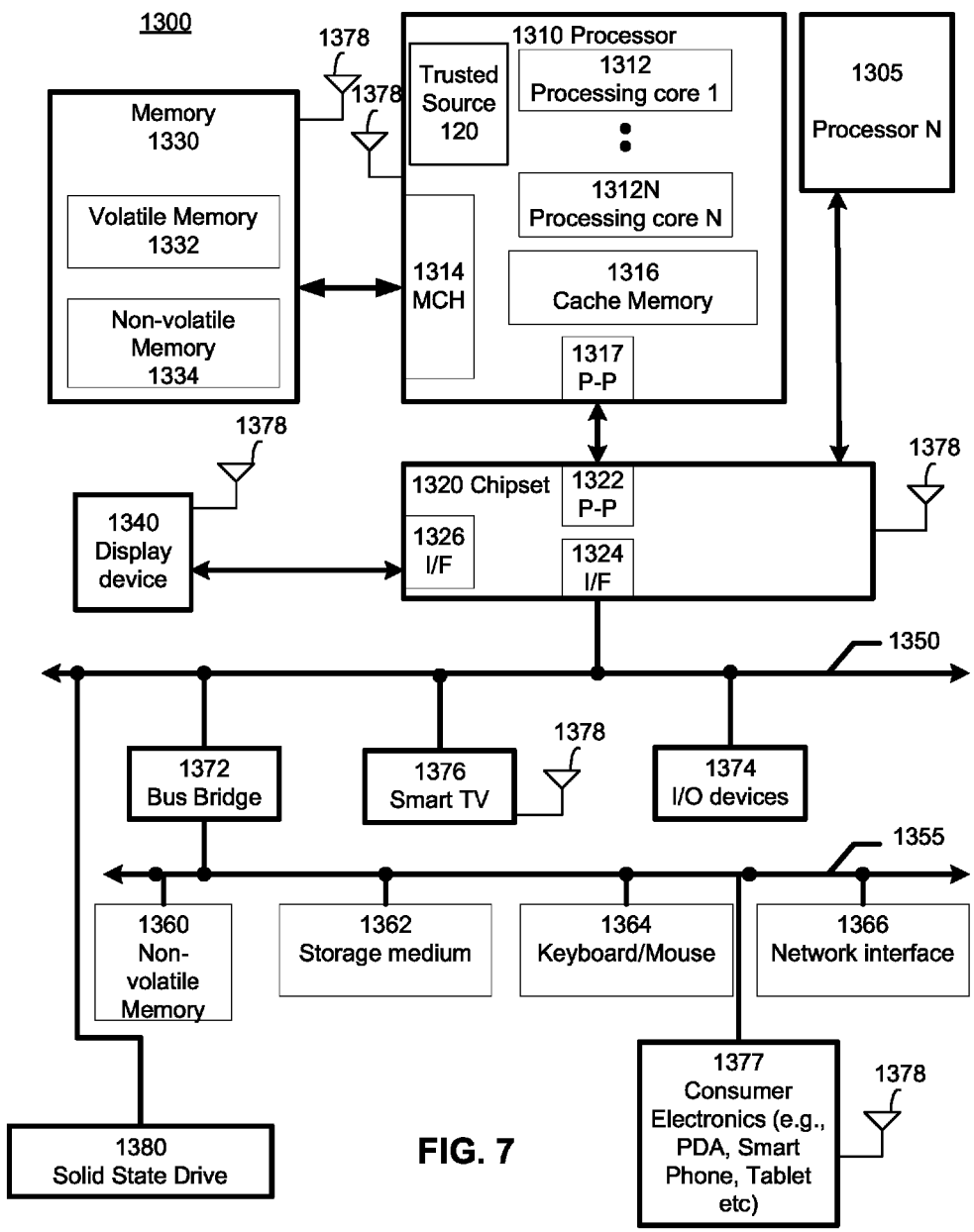
FIG. 7 is a system level diagram comprising a host coupled to a solid state drive (SSD) which is operable to provide a protected storage for a backup image of platform firmware or for any other software that needs protection, according to one embodiment of the invention.

FIG. 7 is a system level diagram comprising a host coupled to a solid state drive (SSD) which is operable to provide a protected storage for a backup image of platform firmware or for any other software that needs protection, according to one embodiment of the invention.

FIG. 7 is a system level diagram comprising a processor and/or memory controller to refresh the non-volatile memory, according to one embodiment of the invention. FIG. 5 also includes a machine-readable storage medium to execute computer readable/executable instructions to perform the methods of various embodiments. The computer readable/executable instructions are executed by a processor (e.g., processor 111, memory controller 201). Elements of embodiments are also provided as a machine-readable medium for storing the computer-executable instructions (e.g., instructions to implement the flowchart of FIG. 5A-D and FIGS. 6A-B and other processes discussed in the description). In one embodiment, the processes performed by the memory controller 201 of the SSD 130 reside in the non-volatile memory of the SSD 130.

The machine-readable medium may include, but is not limited to, flash memory, optical disks, HDD, SSD, CD-ROMs, DVD ROMs, RAMs, EPROMs, EEPROMs, magnetic or optical cards, or other type of machine-readable media suitable for storing electronic or computer-executable instructions. For example, embodiments of the invention may be downloaded as a computer program (e.g., BIOS) which may be transferred from a remote computer (e.g., a server) to a requesting computer (e.g., a client) by way of data signals via a communication link (e.g., a modem or network connection).

In one embodiment, the system 1300 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, the system 1300 implements the methods disclosed herein and may be a system on a chip (SOC) system.

In one embodiment, the processor 1310 has one or more processing cores 1312 and 1312N, where 1312N represents the Nth processor core inside the processor 1310 where N is a positive integer. In one embodiment, the system 1300 includes multiple processors including processors 1310 and 1305, where processor 1305 has logic similar or identical to logic of processor 1310. In one embodiment, the system 1300 includes multiple processors including processors 1310 and 1305 such that processor 1305 has logic that is completely independent from the logic of processor 1310. In such an embodiment, a multi-package system 1300 is a heterogeneous multi-package system because the processors 1305 and 1310 have different logic units. In one embodiment, the processing core 1312 includes, but is not limited to, pre-fetch logic to fetch instructions, decode logic to decode the instructions, execution logic to execute instructions and the like. In one embodiment, the processor 1310 has a cache memory 1316 to cache instructions and/or data of the system 1300. In another embodiment of the invention, the cache memory 1316 includes level one, level two and level three, cache memory, or any other configuration of the cache memory within the processor 1310.

In one embodiment, processor 1310 includes a memory control hub (MCH) 1314, which is operable to perform functions that enable the processor 1310 to access and communicate with a memory 1330 that includes a volatile memory 1332 and/or a non-volatile memory 1334. In one embodiment, the memory control hub (MCH) 1314 is positioned outside of the processor 1310 as an independent integrated circuit.

In one embodiment, the processor 1310 is operable to communicate with the memory 1330 and a chipset 1320. In one embodiment, the processor 1310 (same as 110 of FIG. 1) and the chipset 1320 are part of the host 101 of FIG. 1. In one embodiment, the chipset 1320 (same as 170 of FIG. 1) is coupled to a SSD 1380 (same as 130 of FIG. 1) via a SATA bus 1350 (same as bus 180 of FIG. 1). In one embodiment, the SSD 1380 includes machine-readable medium for storing the computer-executable instructions to implement the flowchart of FIG. 6A-B and other processes discussed in the description that are to be performed by the memory controller 201 of the SSD 130. In such an embodiment, the a processor in the SSD 1380 executes the computer-executable instructions when the SSD 1380 is powered up.

In one embodiment, the processor 1310 is also coupled to a wireless antenna 1378 to communicate with any device configured to transmit and/or receive wireless signals. In one embodiment, the wireless antenna interface 1378 operates in accordance with, but is not limited to, the Institute of Electrical and Electronics Engineers (IEEE) 802.11 standard and its related family, HomePlug AV (HPAV), Ultra Wide Band (UWB), Bluetooth, WiMAX, or any form of wireless communication protocol.

In one embodiment, the volatile memory 1332 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1334 includes, but is not limited to, flash memory (e.g., NAND, NOR), phase change memory (PCM), read-only memory (ROM), electrically erasable programmable read-only memory (EEPROM), or any other type of non-volatile memory device.

The memory 1330 stores information and instructions to be executed by the processor 1310. In one embodiment, memory 1330 may also store temporary variables or other intermediate information while the processor 1310 is executing instructions. In one embodiment, chipset 1320 connects with processor 1310 via Point-to-Point (PtP or P-P) interfaces 1317 and 1322. In one embodiment, chipset 1320 enables processor 1310 to connect to other modules in the system 1300. In one embodiment of the invention, interfaces 1317 and 1322 operate in accordance with a PtP communication protocol such as the INTEL® QuickPath Interconnect (QPI) or the like.

In one embodiment, the chipset 1320 is operable to communicate with the processor 1310, 1305, display device 1340, and other devices 1372, 1376, 1374, 1360, 1362, 1364, 1366, 1377, etc. In one embodiment, the chipset 1320 is also coupled to a wireless antenna 1378 to communicate with any device configured to transmit and/or receive wireless signals.

In one embodiment, chipset 1320 connects to a display device 1340 via an interface 1326. In one embodiment, the display 1340 includes, but is not limited to, liquid crystal display (LCD), plasma, cathode ray tube (CRT) display, or any other form of visual display device. In one embodiment of the invention, processor 1310 and chipset 1320 are merged into a single SOC. In addition, the chipset 1320 connects to one or more buses 1350 and 1355 that interconnect various modules 1374, 1360, 1362, 1364, and 1366. In one embodiment, buses 1350 and 1355 may be interconnected together via a bus bridge 1372 if there is a mismatch in bus speed or communication protocol. In one embodiment, chipset 1320 couples with, but is not limited to, a non-volatile memory 1360, a mass storage device(s) 1362, a keyboard/mouse 1364, and a network interface 1366 via interface 1324, smart TV 1376, consumer electronics 1377, etc.

In one embodiment, the mass storage device 1362 includes, but is not limited to, a solid state drive, a hard disk drive, a universal serial bus flash memory drive, or any other form of computer data storage medium. In one embodiment, network interface 1366 is implemented by any type of well known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, HomePlug AV (HPAV), Ultra Wide Band (UWB), Bluetooth, WiMAX, or any form of wireless communication protocol.

While the modules shown in FIG. 5 are depicted as separate blocks within the system 1300, the functions performed by some of these blocks may be integrated within a single semiconductor circuit or may be implemented using two or more separate integrated circuits. For example, although the cache memory 1316 is depicted as a separate block within the processor 1310, the cache memory 1316 can be incorporated into the processor core 1312 respectively. In one embodiment, the system 1300 may include more than one processor/processing core in another embodiment of the invention.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description. The embodiments of the invention are intended to embrace all such alternatives, modifications, and variations as to fall within the broad scope of the appended claims.

We claim:

1. A method comprising:
providing, by a processor, a protected storage area in a non volatile memory for storing a backup image of software;
detecting corruption in the software;
accessing the backup image of the software from the protected storage area; and
updating the corrupted software using the backup image, wherein the protected storage area is a vendor specific reserved log information storage area of the non volatile memory, the vendor specific reserved log information storage area nominally to store device monitoring information concerning the non volatile memory.

2. The method of claim 1, wherein accessing the backup image of the software from the protected storage area comprises:
identifying whether the non volatile memory is paired with the processor; and
in response to identifying that the non volatile memory is not paired with the processor, pairing with the non volatile memory by sending a command to the non volatile memory to write a key in a dedicated area of the non volatile memory, wherein successful pairing with the non volatile memory causes the non volatile memory to enter a paired and unprivileged state.

3. The method of claim 2 further comprising, in response to pairing, entering a paired and privileged state with the non volatile memory by authenticating the non volatile memory in the paired and unprivileged state.

4. The method of claim 2 further comprising de-provisioning the non volatile memory from the paired and unprivileged state of the non volatile memory to an unpaired state by sending a command to the non volatile memory which triggers a challenge-response protocol with another machine.

5. The method of claim 3 further comprising exiting from the paired and privileged state to the paired and unprivileged state of the non volatile memory by sending a command to the non volatile memory to close a secured session.

6. The method of claim 3 further comprising un-pairing the non volatile memory from the host by sending a command to the non volatile memory to delete the key, wherein the non volatile memory is in the paired and privileged state prior to the un-pairing.

7. The method of claim 3 further comprising re-provisioning the non volatile memory back in the paired and privileged state by sending a command to the non volatile memory to override the key stored in the non volatile memory.

8. The method of claim 3, wherein authenticating the paired non volatile memory comprises sending a command to the non volatile memory to trigger a challenge-response protocol with the non volatile memory and the processor for mutual authentication of the non volatile memory and the processor.

9. The method of claim 8, wherein the mutual authentication comprises:
receiving a first encrypted random number from the non volatile memory, the first encrypted random number encrypted with the key;
decrypting the first encrypted random number to generate a first decrypted message; and
sending the first decrypted message to the non volatile memory;
wherein the non volatile memory verifies the first decrypted message from the host for authenticating the host.

10. The method of claim 8, wherein the authenticating further comprises:
sending a second encrypted random number to the non volatile memory, the second encrypted random number generated by encrypting a second random number with the key;
receiving a second decrypted message from the non volatile memory, wherein the non volatile memory generates the second decrypted message by decrypting the second encrypted random number; and
sending an acknowledgement to the non volatile memory if the second decrypted message matches the second random number.

11. The method of claim 1, wherein the backup image of the software comprises backup images of software of one or more components of a computer platform, and wherein the non-volatile memory is part of a solid state drive (SSD).

12. A machine readable storage medium, and not a signal in transmission, including computer executable instructions that when executed cause a processor to perform a method, the method comprising:
pairing with a host, by provisioning secret and public keys from the host, to enter a paired and unprivileged state;
authenticating the host, by a challenge-response protocol, to enter a paired and privileged state from the paired and unprivileged state; and
allowing secure access, to the host, of a backup image of software stored in a vendor specific reserved log information storage area of a non-volatile memory, the allowing of secure access is in response to entering the paired and privileged state, the vendor specific reserved log information storage area nominally to store device monitoring information concerning the non volatile memory.

13. The machine readable storage medium of claim 12, and not a signal in transmission, wherein pairing with the host by provisioning the secret and public keys comprises:
receiving the secret and public keys from the host;
storing the secret and public keys; and
sending an acknowledgement to the host in response to storing the secret and public keys.

14. The machine readable storage medium of claim 12, and not a signal in transmission, wherein authenticating the host comprises:
sending a first encrypted random number to the host, the first encrypted random number generated by encrypting a first random number with the secret key;
receiving a response from the host in response to sending the first encrypted random number, wherein the host generates the response by decrypting the first encrypted random number; and
verifying the response for authenticating the host, the host being authenticated when verifying the response is successful.

15. The machine readable storage medium of claim 14, and not a signal in transmission, including further computer executable instructions that when executed cause the processor to perform a further method which comprises:
receiving a second encrypted random number from the host, the second encrypted random number generated by encrypting a second random number with the secret key;
decrypting the second encrypted random number to generate a decrypted message;
sending the decrypted message to the host for the host to match the decrypted message with the second random number; and
receiving an acknowledgement from the host after sending the decrypted message.

16. The machine readable storage medium of claim 12, and not a signal in transmission, including further computer executable instructions that when executed cause the processor to perform a further method which comprises: exiting the paired and privileged state in response to a command from the host.

17. The machine readable storage medium of claim 12, and not a signal in transmission, including further computer executable instructions that when executed cause the processor to perform a further method which comprises: de-provisioning the non-volatile memory by un-pairing the non-volatile memory and entering an unpaired state, wherein de-provisioning is performed by a challenge-response protocol with a server.

18. The machine readable storage medium of claim 12, and not a signal in transmission, including further computer executable instructions that when executed cause the processor to perform a further method which comprises: un-pairing the non-volatile memory by deleting the secret key previously provisioned from the host, wherein the non-volatile memory is in the paired and privileged state prior to the un-pairing.

19. The machine readable storage medium of claim 12, and not a signal in transmission, including further computer executable instructions that when executed cause the processor to perform a further method which comprises: re-provisioning the non-volatile memory by overriding the secret key in response to a command from the host, wherein the non-volatile memory is in the paired and privileged state prior to and after the re-provisioning.

20. The machine readable storage medium of claim 12, and not a signal in transmission, wherein the memory controller and the non-volatile memory are part of a solid state drive (SSD).

21. A system comprising:
a host comprising a processor;
a display coupled to the host; and
a solid state drive (SSD), coupled to the host, the SSD comprising:
a memory controller, coupled to a non-volatile memory, operable to:
store a backup image of software in a vendor specific reserved log information storage area of the non-volatile memory, the device specific reserved log information storage area nominally to store device monitoring information concerning the non volatile memory;
pair with the host, by provisioning secret and public keys from the host, to enter a paired and unprivileged state;
authenticate the host, by a challenge-response protocol, to enter a paired and privileged state from the paired and unprivileged state; and
allow secure access, to the host, of the backup image of the software in response to entering the paired and privileged state.

22. The system of claim 21, wherein the memory controller is operable to pair with the host by performing a method comprising:
receiving the secret and public keys from the host;
storing the secret and public keys; and
sending an acknowledgement to the host in response to storing the secret and public keys.

23. The system of claim 21, wherein the memory controller is operable to authenticate the host by performing a method comprising:
- sending a first encrypted random number to the host, the first encrypted random number generated by encrypting a first random number with the secret key;
- receiving a response from the host in response to sending the first encrypted random number, wherein the host generates the response by decrypting the first encrypted random number; and
- verifying the response for authenticating the host, the host being authenticated when verifying the response is successful.

24. The system of claim 21, wherein the memory controller is operable to perform at least one of:
- exit the paired and privileged state in response to a command from the host;
- de-provision the non-volatile memory by un-pairing the non-volatile memory and entering an unpaired state, wherein de-provisioning is performed by a challenged-response protocol with a server;
- un-pair the non-volatile memory by deleting the secret key previously provisioned from the host, wherein the non-volatile memory is in the paired and privileged state prior to the un-pairing;
- re-provision the non-volatile memory by overriding the secret key in response to a command from the host, wherein the non-volatile memory is in the paired and privileged state prior to and after the re-provisioning.

25. The system of claim 21, wherein the display is a touch screen, and wherein software is a firmware.

26. An apparatus, comprising:
a memory controller to communicate to a non-volatile memory, the memory controller to:
- store a backup image of software in a vendor specific reserved log information storage area of the non-volatile memory, the device specific reserved log information storage area nominally to store device monitoring information concerning the non volatile memory;
- pair with a host, by provisioning secret and public keys from the host, to enter a paired and unprivileged state;
- authenticate the host, by a challenge-response protocol, to enter a paired and privileged state from the paired and unprivileged state; and
- allow secure access, to the host, of the backup image of the software in response to entering the paired and privileged state.

27. The apparatus of claim 26 wherein the non volatile memory is a phase change memory.

* * * * *